(12) United States Patent
Daniel

(10) Patent No.: US 9,227,781 B1
(45) Date of Patent: Jan. 5, 2016

(54) STORAGE TANKS USING SUPER ELLIPSE GEOMETRIES

(71) Applicant: Ashlawn Energy, LLC, Alexandria, VA (US)

(72) Inventor: Maurice Daniel, Alexandria, VA (US)

(73) Assignee: Ashlawn Energy, LLC, Alexandria, VA (US)

( * ) Notice: Subject to any disclaimer, the term of this patent is extended or adjusted under 35 U.S.C. 154(b) by 0 days.

(21) Appl. No.: 14/315,389

(22) Filed: Jun. 26, 2014

Related U.S. Application Data

(60) Provisional application No. 61/957,164, filed on Jun. 26, 2013.

(51) Int. Cl.
| | |
|---|---|
| *H01M 8/18* | (2006.01) |
| *H01M 8/20* | (2006.01) |
| *B65D 90/02* | (2006.01) |

(52) U.S. Cl.
CPC ............... *B65D 90/02* (2013.01); *H01M 8/188* (2013.01); *H01M 8/20* (2013.01)

(58) Field of Classification Search
CPC ....................................................... H01M 8/188
See application file for complete search history.

(56) References Cited

U.S. PATENT DOCUMENTS

| | | | | |
|---|---|---|---|---|
| 5,746,260 | A * | 5/1998 | Vesborg | 141/319 |
| 6,367,647 | B1 * | 4/2002 | Rudiger et al. | 220/560.04 |
| 2006/0096980 | A1 * | 5/2006 | Jaslow | 220/4.12 |
| 2008/0241643 | A1 * | 10/2008 | Lepp et al. | 429/61 |
| 2011/0013989 | A1 * | 1/2011 | Wu | 405/210 |

* cited by examiner

*Primary Examiner* — Ula C. Ruddock
*Assistant Examiner* — Scott J Chmielecki
(74) *Attorney, Agent, or Firm* — Raymond Van Dyke; Van Dyke Law

(57) ABSTRACT

A storage system and method are provided. The storage system may be for storing fluids, and include a first storage tank having an internal first volume defined by one or more exterior sides of the first storage tank being designed to have a super elliptical shape circumscribed by a rectangle or square so that the internal first volume is greater than an internal volume of a storage tank designed to have an elliptical or circular shape circumscribed by the rectangle or the square. The circumscribing rectangle may be a golden rectangle.

43 Claims, 13 Drawing Sheets

STORAGE TANKS USING SUPER ELLIPSE GEOMETRIES

CROSS-REFERENCE TO RELATED APPLICATIONS

This application claims the benefit of U.S. Provisional Application No. 61/957,164, filed Jun. 26, 2013, in the United States Patent and Trademark Office, the disclosure of which is incorporated herein by reference.

BACKGROUND

1. Field

One or more embodiments include one or more storage tanks with at least one side being designed to have a super elliptical, one or more embodiments include one or more storage tanks in a chemical system that are designed to have at least one side be super elliptical shaped, one or more embodiments include storage tanks designed to have at least one side be super elliptical shaped in a redox flow battery system, and one or more embodiments of such a redox flow battery system that include one or more strings of storage tanks designed to store electrolyte and have at least one side be super elliptical shaped for increased storage efficiency and improved self-support.

2. Description of the Related Art

Large outdoor storage tanks are usually made of steel and mounted on concrete pads. Large indoor chemical storage tanks are often made of stainless steel or polypropylene and may be mounted on a concrete floor or be rack mounted. Most large storage tanks are in the shape of a vertically mounted cylinder having a horizontal cross-sectional area in the shape of a circle. It is generally of advantage to keep the height of the tank to a minimum in order to minimize the fluid pressures near the bottom of the storage tank. It is also generally of advantage to reduce the ground or floor area occupied by the storage tank to reduce the real estate costs, balanced with a height of the storage tank and desired volume of fluid being stored.

Buildings are generally rectangular in shape and therefore typically have floors that are laid out in rectilinear patterns. Outdoor real estate is also generally laid out in rectilinear plots of ground. To make maximum use of available floor space or outdoor real estate it would be most efficient to use storage tanks that have a square or rectangular cross-section. However, because of internal fluid pressures, the lateral (or vertical) sides of large square or rectangular storage tanks would typically bulge outwards unless the storage tank walls were made exceptionally thick and rigid. Storage tanks are therefore generally made to have a circular cross-section to minimize the material requirements, as a circle cross-section provides substantial self-support for the storage tank typically counteracting such internal fluid pressures.

A circular cross-section tank resting on a rectangular floor layout occupies a square area of floor space. Thus, the floor area between the circular tank area and the circumscribed square floor area represents wasted floor space. For a circle or an ellipse this represents 21.5% of wasted floor space. This wasted space could be partly recovered by using a square (or rectangular) tank having rounded corners. Although this geometry would recover a significant portion of the wasted space between the circle and the square, it leaves the tank with long un-curved wall segments that must be reinforced to resist the internal fluid pressures.

The above discussion applies equally to circular cross-section tanks and their circumscribed squares, and to elliptical cross-section tanks and their circumscribed rectangles. Circles are a special case of the more general elliptical shape, so the discussions which follow will focus on elliptically shaped cross-section tanks, even though elliptical tanks are rather rare in tank designs.

SUMMARY

One or more embodiments include a storage system for storing fluids, including a large first storage tank having an internal first volume defined by one or more exterior sides of the large first storage tank being designed to have a super elliptical shape circumscribed by a rectangle or square so that the internal first volume is greater than an internal volume of a storage tank designed to have an elliptical or circular shape circumscribed by the rectangle or the square.

A super circular shape, the super elliptical shape, the elliptical shape, and circular shape may be respectively defined by different Lamé curves, with the Lamé curves being defined according to:

$$\frac{x^n}{a^n} + \frac{y^m}{b^m} = 1$$

Here, the super circular shape is a type of the super elliptical shape and may be defined by the exponents n and/or m being greater than 2 and a=b, the super elliptical shape may be defined by the exponents n and/or m being greater than 2 and a≠b, the circular shape may be defined by the exponents n and m being 2 and a=b, and the elliptical shape may be defined by the exponents n and m being 2 and a≠b.

The first storage tank may be a cylinder designed to have a super elliptical cross-section so that more area within the rectangle or square is used to store fluid in the first storage tank than an area within the rectangle or square that would be used if the first storage tank was designed to have an elliptical or circular cross-section.

When m and n are 3, the more area within the rectangle or square used to store the fluid in the first storage tank may be at least 9% greater than the area that would have been used if the first storage tank was designed to have the elliptical or circular cross-section.

The system may further include a string of storage tanks, including the first storage tank and a second storage tank, with both of the first and second storage tanks being designed to have at least one respective super elliptical shaped side.

The first storage tank and the second storage tank may have a same designed internal volume based on the at least one respective super elliptical shaped side.

The first storage tank and the second storage tank may be designed to store liquid electrolyte for a flow battery system.

Plural storage tanks, including the first storage tank and the second storage tank, of the string of storage tanks may be designed to have super elliptical cross-sections and are arranged in close proximity in a tank farm that includes plural strings of storage tanks.

One of the plural strings of storage tanks may be designed to store a positive electrolyte and be connected to a positive side of a battery stack of a redox flow battery and another of the plural strings of storage tanks may be designed to store a negative electrolyte and be connected to a negative side of the battery stack of the redox flow battery.

Plural storage tanks, including the first storage tank and the second storage tank, of the string of storage tanks may be designed so as to share one side instead of having two separate respective adjacent sides.

The super circular shape may be defined by fractional exponents n and/or m being greater than 2 and a=b and the super elliptical shape may be defined by the fractional exponents n and/or m being greater than 2 and a≠b.

The rectangle or square may respectively be a golden rectangle.

The first storage tank may be a cylinder designed to have a super elliptical cross-section, with the first storage tank being partitioned into two or more first sub-storage tanks.

At least two of the two or more first sub-storage tanks may have a same volume.

The partitioning of the first storage tank may include partitioning the first storage tank into the at least two of the two or more first sub-storage tanks that have the same volume and partitioning the first storage tank into at least one second sub-storage tank having a different volume than the same volume of the at least two of the two or more first sub-storage tanks.

At least two of the first sub-storage tanks may have different volumes.

The partitioning of the first storage tank may include partitioning out at least one portion of the first storage tank from an interior of the first storage tank, so that the partitioned out portion of the first storage tank provides mechanical access to inner facing sides of the partitioned first storage tank.

The first storage tank may be designed so that a cross-section along a first axis of the first storage tank has the super elliptical shape and so that a cross-section along a second axis of the first storage tank, orthogonal to the first axis, has another super elliptical shape.

One or more embodiments include a flow battery system that includes a first battery stack including a first half-cell utilizing a liquid electrolyte, a feed system, including at least a first storage tank to store the liquid electrolyte and designed to have a super elliptical cross-section, configured to provide the stored electrolyte to the first half-cell from at least the first storage tank, and a return system to return the liquid electrolyte from the first half-cell to the first feed system after having been charged or discharged by the first half-cell.

The feed system may further include a string of storage tanks, including the first storage tank and a second storage tank, and at least two of the storage tanks in the string of storage tanks may have super elliptical cross-sections.

The super elliptical cross-section of the first storage tank may be designed to be within a golden rectangle.

The feed system may further include a first booster tank, designed to generate a first booster pressure in the first booster tank for the liquid electrolyte sufficient to force the liquid electrolyte to be fed from the first feed system through the first half-cell, and wherein the first booster tank is a tank formed by partitioning a larger storage tank, so that the partitioning of the larger storage tank forms the first booster tank and the first storage tank.

The first storage tank may be designed to have a vertical super elliptical side and a horizontal super elliptical cross-section, such that the super elliptical cross-section of the first storage tank may be different from a super elliptical cross-section of the second storage tank.

One or more embodiments include a storage method for storing fluids, including implementing use of a large first storage tank having an internal first volume defined by one or more exterior sides of the large first storage tank being designed to have a super elliptical shape circumscribed by a rectangle or square so that the internal first volume is greater than an internal volume of a storage tank designed to have an elliptical or circular shape circumscribed by the rectangle or the square.

A super circular shape, the super elliptical shape, the elliptical shape, and circular shape may be respectively defined by different Lamé curves, with the Lamé curves being defined according to:

$$\frac{x^n}{a^n} + \frac{y^m}{b^m} = 1$$

Here, the super circular shape is a type of the super elliptical shape and may be defined by the exponents n and/or m being greater than 2 and a=b, the super elliptical shape may be defined by the exponents n and/or m being greater than 2 and a≠b, the circular shape may be defined by the exponents n and m being 2 and a=b, and the elliptical shape may be defined by the exponents n and m being 2 and a≠b.

The first storage tank may be a cylinder designed to have a super elliptical cross-section so that more area within the rectangle or square is used to store fluid in the first storage tank than an area within the rectangle or square that would be used if the first storage tank was designed to have an elliptical or circular cross-section.

When m and n are 3, the more area within the rectangle or square used to store the fluid in the first storage tank may be at least 9% greater than the area that would have been used if the first storage tank was designed to have the elliptical or circular cross-section.

The method may further implement the use of a string of storage tanks, including the first storage tank and a second storage tank, with both of the first and second storage tanks being designed to have at least one respective super elliptical shaped side.

The first storage tank and the second storage tank may have a same designed internal volume based on the at least one respective super elliptical shaped side.

The first storage tank and the second storage tank may be designed to store liquid electrolyte for a flow battery system.

Plural storage tanks, including the first storage tank and the second storage tank, of the string of storage tanks may be designed to have super elliptical cross-sections and be arranged in close proximity in a tank farm that includes plural strings of storage tanks.

One of the plural strings of storage tanks may be designed to store a positive electrolyte and be connected to a positive side of a battery stack of a redox flow battery and another of the plural strings of storage tanks may be designed to store a negative electrolyte and be connected to a negative side of the battery stack of the redox flow battery.

Plural storage tanks, including the first storage tank and the second storage tank, of the string of storage tanks may be designed so as to share one side instead of having two separate respective adjacent sides.

The super circular shape may be defined by fractional exponents n and/or m being greater than 2 and a=b and the super elliptical shape may be defined by the fractional exponents n and/or m being greater than 2 and a≠b.

The rectangle or square may respectively be a golden rectangle.

The first storage tank may be designed, based on at least one of the one or more exterior sides of the first storage tank having been designed to have the super elliptical shape, to need less reinforcements for the first storage tank to counter outward forces, caused by internal pressures deriving from fluid stored in first storage tank along the at least one of the one or more exterior sides of the first storage tank, than if the at least one of the one or more exterior sides of the first storage tank was designed to be elliptical or circular shaped.

The first storage tank may be a cylinder designed to have a super elliptical cross-section, with the first storage tank being partitioned into two or more first sub-storage tanks.

At least two of the two or more first sub-storage tanks may have a same volume.

The partitioning of the first storage tank may include partitioning the first storage tank into the at least two of the two or more first sub-storage tanks that have the same volume and partitioning the first storage tank into at least one second sub-storage tank having a different volume than the same volume of the at least two of the two or more first sub-storage tanks.

At least two of the first sub-storage tanks may have different volumes.

The partitioning of the first storage tank may include partitioning out at least one portion of the first storage tank from an interior of the first storage tank, so that the partitioned out portion of the first storage tank provides mechanical access to inner facing sides of the partitioned first storage tank.

The first storage tank may be designed so that a cross-section along a first axis of the first storage tank has the super elliptical shape and so that a cross-section along a second axis of the first storage tank, orthogonal to the first axis, has another super elliptical shape.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1A:
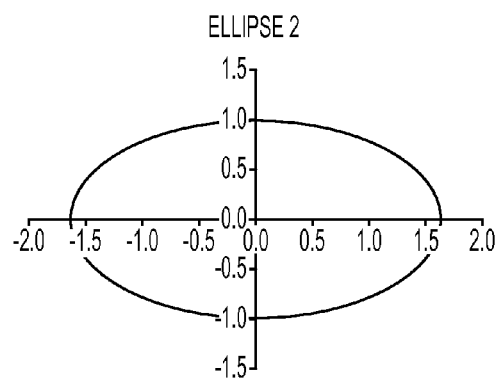
FIGS. 1A-1D respectively illustrate an example ellipse curve and three example super ellipse curves, according to one or more embodiments.

Reference will now be made in detail to one or more embodiments, illustrated in the accompanying drawings, wherein like reference numerals refer to like elements throughout. In this regard, available embodiments may be embodied in many different forms and should not be construed as being limited to embodiments set forth herein. Accordingly, embodiments are merely described below, by referring to the figures, to explain aspects of the present invention.

Furthering the background-noted countering goals for storage tank designs, if a goal in the design of a storage tank is to make better use of the available space, the inventor believes that elliptical shaped tanks aught to be considered more often since it is far more likely that the available space is rectangular rather than being square. In addition, as described below, a super elliptical shape of a storage tank may make the best use of available space while still countering the internal fluid pressures of the storage tank to avoid such bulging or deformation of the storage tank.

Accordingly, one or more embodiments relate to an efficient storage of water, chemicals, fuels, electrolytes, or the like in large storage tanks, e.g., where floor or ground space is at a premium. More specifically one or more embodiments relate to the inventor's innovative use of super elliptical geometries in the design of large storage tanks so as to store an increased volume of chemicals within a given rectangular or square floor area, compared to a circular cross-sectioned cylindrical storage tank. One or more embodiments also include partitioning approaches for partitioning large storage tanks into a number of equal, for example, smaller volumes for use in storing a variety of chemicals in large tanks. Here, the interaction forces/pressures from the different partitions may increase stability of the storage tank while also increasing storage volumes of the partitioned volumes. Still further, in one or more embodiments the storage tanks may be designed to store electrolytes for large redox flow battery systems.

One or more embodiments also relate to novel methods of storing bulk chemicals, most notably the bulk storage of liquid chemicals, for example. Large amounts of chemicals are usually stored in large circular cross-sectioned cylindrical tanks resting on the ground on a specially prepared concrete pad. Alternatively, the tank foundation may be recessed into the ground or floor and surrounded by a wall to form a moat, or chemical holding area, to contain any chemical spillage that may occur. Large storage tanks are ubiquitous in the urban landscape for storage of water and fuels. In industrial facilities, in addition to water and fuel, large storage tanks are used for chemical storage. In farm and food processing facilities large tanks and silos are also used to store vegetable oils, wine and fruit juices, diary products, and a wide variety of both solid and liquid food and agricultural ingredients. Most recently, large redox flow batteries are coming into service that requires large storage tanks to contain the associated electrolytes. Storage tanks may be situated indoors or outdoors and are usually made of steel stainless steel, concrete, or plastic. Herein, a large storage tank is a storage tank that stores at least 1000 gallons, a medium sized storage tank stores less than the large storage tanks but at least 100 gallons, and a small storage tank stores less than 100 gallons.

With few exceptions, the largest conventional storage tanks are vertically-mounted cylinders, with the horizontal cross-sectional area being in the shape of a circle. Medium sized storage tanks are often horizontality mounted cylinders, where some of these middle sized storage tanks have an oval (ellipse) cross-section. The smaller storage tanks, such as a fuel tank of an automobile, may have a variety of regular or irregular shapes depending on the application.

One or more embodiments herein address medium to large size storage tanks in particular, but may also apply to the smaller sizes as well. In particular, one or more embodiments address storage tanks where space is at a premium and it becomes desirable to increase the ratio of storage volume to floor area as much as possible; such as encountered when the tanks are situated indoors where real-estate costs are high. One or more embodiments include a number of storage tanks, forming a small or large tank farm, that are co-located in a high-cost floor space area. One or more embodiments additionally apply when a variety of chemicals are stored in a number of tanks.

One or more embodiments include the storage of electrolytes in large redox flow batteries (RFB), e.g., in medium to large storage tanks. Flow batteries usually require two liquid electrolytes; where one electrolyte provides the positive couple (catholyte) of the battery and the other electrolyte provides the negative couple (anolyte). These two electrolyte components are kept in separate storage tanks. The electrolytes must usually pass through a battery stack several times before becoming fully charged or discharged. Some RFB designs include intermediate storage tanks for the electrolyte in intermediate states of charge. Also, in some electrolyte transfer schemes it is desirable to have one empty tank on both the positive and negative sides of the battery to assist in keeping a separation between charged and uncharged electrolyte. Large RFBs may therefore require thousands of gallons of electrolyte to be stored and distributed among a number of equal, for example, volume storage tanks or the like.

One or more embodiments have further applications where water, fuel, chemicals, food ingredients, agricultural products, and the like could be more efficiently contained using a super ellipse tank design. Some of these applications may require multiple tanks and some applications may require multiple tanks of equal, for example, volume.

Accordingly, one or more embodiments provide a storage tank design that makes more efficient use of rectilinear floor space than storage tanks having circular or elliptical horizontal cross-sections by designing at least one side of the storage tank to have a super elliptical form/shape. In one or more embodiments, where at least one side may be formed along the vertical sides of the storage tank so that the storage tank has a super elliptical cross-section. Accordingly, one or more embodiments includes designing the storage tank so that one, or two, or three of the storage tank symmetry planes include super elliptical shaped portions of the storage tank. One or more embodiments further include designing storage tanks so as to minimize the real estate required by a tank farm made up of a number of storage tanks situated in close proximity to one another. One or more embodiments include designing storage tanks so as to provide partitioning approaches of super elliptical shaped storage tanks, e.g., to partition a super elliptical storage tank into a number of equal, for example, containment volumes. Alternatively, the partitioned storage tanks may include a number of different and/or identically shaped storage tanks.

The general equation for an ellipse is set forth below in Equation 1.

$$\frac{x^2}{a^2} + \frac{y^2}{b^2} = 1 \qquad \text{Equation 1}$$

Here, x and y are variables and a and b are the x-axis and y-axis intercepts.

A circle is a special case of the ellipse where a=b=r, which yields the below Equation 2.

$$\frac{x^2}{r^2} + \frac{y^2}{r^2} = 1 \text{ or: } x^2 + y^2 = r^2 \qquad \text{Equation 2}$$

It is defined herein that a super ellipse equation has a similar form as the equation of an ellipse except that the exponent has some value higher than 2. For example, Equations 3-5 below illustrate different super ellipses of orders 3, 4, and 5.

$$\frac{x^3}{a^3} + \frac{y^3}{b^3} = 1 \qquad \text{Equation 3}$$

$$\frac{x^4}{a^4} + \frac{y^4}{b^4} = 1 \qquad \text{Equation 4}$$

$$\frac{x^5}{a^5} + \frac{y^5}{b^5} = 1 \qquad \text{Equation 5}$$

A super ellipse may also have a fractional valued exponent, greater than two, such as shown below in Equation 6 where the super ellipse is of the order 3.5.

$$\frac{x^{3.5}}{a^{3.5}} + \frac{y^{3.5}}{b^{3.5}} = 1 \qquad \text{Equation 6}$$

Equation 7 below illustrates an equation for curves according to the Lamé family of curves.

$$\frac{x^n}{a^n} + \frac{y^n}{b^n} = 1 \qquad \text{Equation 7}$$

The conventional ellipse is a Lamé curve where n=2. A circle is a special case of a Lamé curve having n=2 and having a=b. Herein, only Lamé curves having n>2 are defined as being "super ellipses." Similarly, a "super circle" is a type of the super ellipse, defined herein as a Lamé curve where n is greater than 2 and a=b.

In general, the super ellipse curve yields a continuous closed curve in the region between an ellipse (or circle) and its enclosing rectangle (or square). When the exponent, e.g., n, has values close to the number 2 the super ellipse curve more closely resembles a ellipse inscribing the example rectangle. As the exponent n increases in value the curve more closely resembles the circumscribed rectangle. Since the exponent of the super ellipse can have fractional values a super ellipse curve can be found to approximate either the rectangle or ellipse to any desired degree. This would allow a cylindrical storage tank to be designed, having a horizontal super ellipse cross-section, to have any desired volume between that of an ellipsoidal cylinder to that of the enclosing rectangular volume.

Storage tanks having Lamé curved cross-sections serve to minimize mechanical stress on the tank walls, while at the same time providing maximum useful volume. A rectangular tank would make maximum use of available floor area, but would allow internal pressures to force or bulge out the walls or lateral sides of the storage tank. Rectangular tanks would therefore require thick walls and/or reinforced walls. An elliptical cross-sectioned tank would allow for a minimum wall thickness; but would also not make efficient use of the floor space. The super ellipse or super circular curves discussed herein may strike a compromise between the two cross-sectional geometries, allowing better use of an available (rectangular or square) floor space while still allowing for relatively thin tank walls.

Figure 1B:
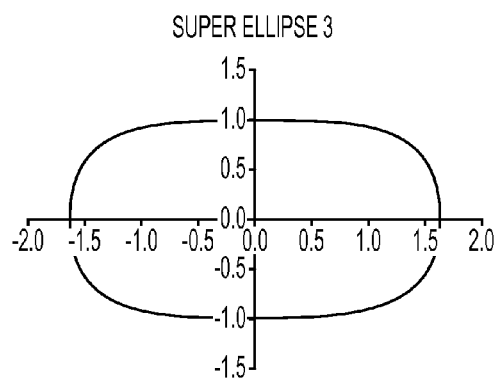
Figure 1C:
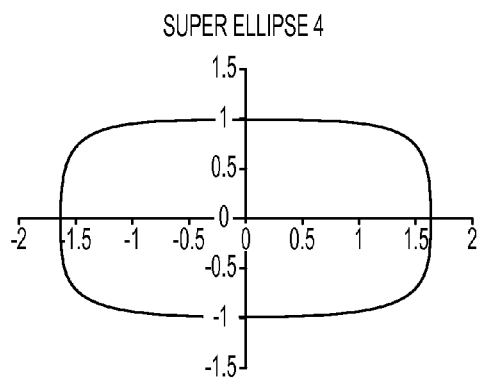
Figure 1D:
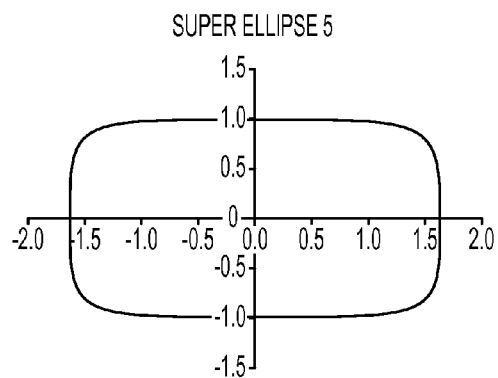

A circle or ellipse occupies 78.5% of the area of a circumscribed square or rectangle; or stated in reverse 21.5% of the circumscribed rectangle is wasted when the storage tank is designed to have a circle or ellipse (exponent n=2) cross-section. As the exponent n is increased, the ellipse takes on more of a rectangular shape as shown by FIGS. 1B-D, and thus occupies more of the available rectangular area. This is also shown in the plot of FIG. 7, which illustrates a plotting of ratios of super ellipse areas to the circumscribed rectangle as a function of the super ellipse exponent.

Figure 7:
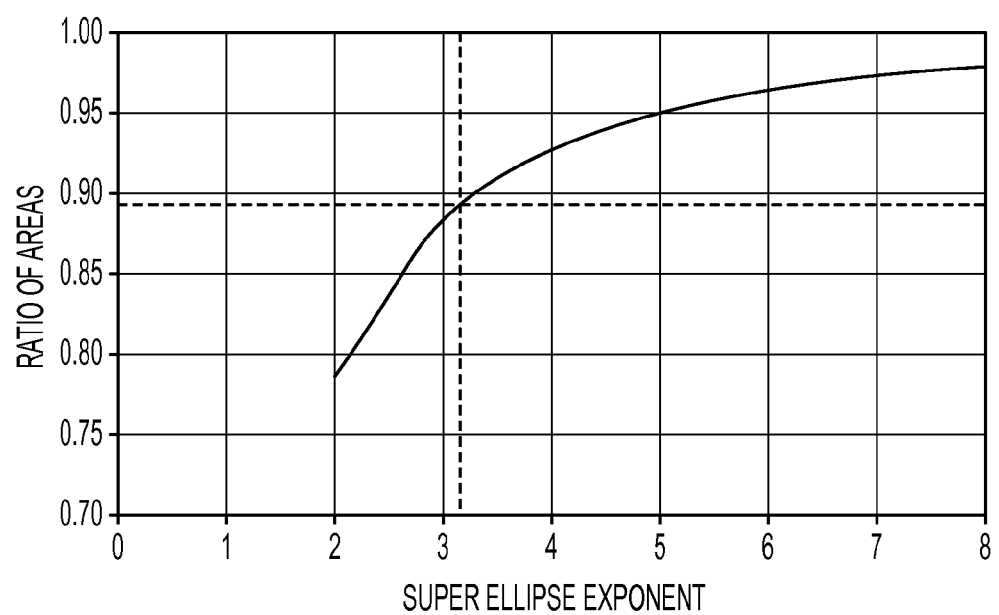
FIG. 7 illustrates a plot of ratios of super ellipse areas to a circumscribed rectangle, according to one or more embodiments.

In FIG. 7, the intersection of the horizontal and vertical dashed lines represents the half-way point between the area of a simple ellipse and the area of the circumscribed rectangle. The vertical line indicates that a super ellipse having an exponent of approximately n=3.15 would recover half the area lost to a simple ellipse or circle. It can also be seen graphically in FIG. 2 that the first super ellipse (n=3) recovers nearly half the area between a simple ellipse and the enclosing rectangle. To be exact, the area of an n=3 super ellipse recovers an additional 9.79% of the enclosed area, or nearly half (45.55%) of the 21.5% area lost using a simple ellipse or circle. Extending these areas upwards to form a cylindrical tank having a super ellipse or super circle cross section extends these same numbers to represent increased tank volume capacity. Thus by simply making a slight change in the shape of a storage tank, from that of a circular cylinder to that of a super ellipse or super circle cylinder, with little increase in tank engineering or materials cost, the available volume can be increased by nearly 10%.

Accordingly, one or more embodiments shown in the drawings illustrate properties of super ellipses, for example, and in particular, how such super ellipse properties apply to chemical storage tanks, and more particularly to large storage tanks. Though some embodiments may focus on storage tanks that are large cylindrical storage tanks that rest upright on the ground or the floor of a building, based on such teachings, one or more embodiments are also directed to other types of storage tanks, such as portable tanks, silos, horizontal tanks, and the like.

In FIGS. 1, 2, 8, and 10, as only an example, the described circumscribed rectangle is referred to as a "golden" rectangle. The golden rectangle has a height/width ratio of 1 to 1.618034 . . . , which is defined according to the below Equation 8.

$$\frac{1+\sqrt{5}}{2} = 1.618034\ldots \qquad \text{Equation 8}$$

The golden rectangle has been found to be an aesthetically pleasing ratio, being neither too short nor too long in appearance. The golden rectangle may provide an optimum ratio for a rectangular tank area, e.g., when it is desired to fit the storage tank on a rectangular area rather than a square area. A large storage tank enclosed in a rectangular volume made up of golden rectangle ratios would very likely require a minimum of additional structural reinforcement. The golden rectangles are hereby used only by way of example, and embodiments are not limited thereto.

Large storage tanks generally include vents, access ports, plumbing, and pumps to move the chemicals into and out of the tanks, pressure equalization mechanisms, drainage valves, safety and pressure relief valves, heat exchangers, and other components and sensors that may be desired for the particular application. Such as discussed below with regard to FIG. 14.

Figure 2:
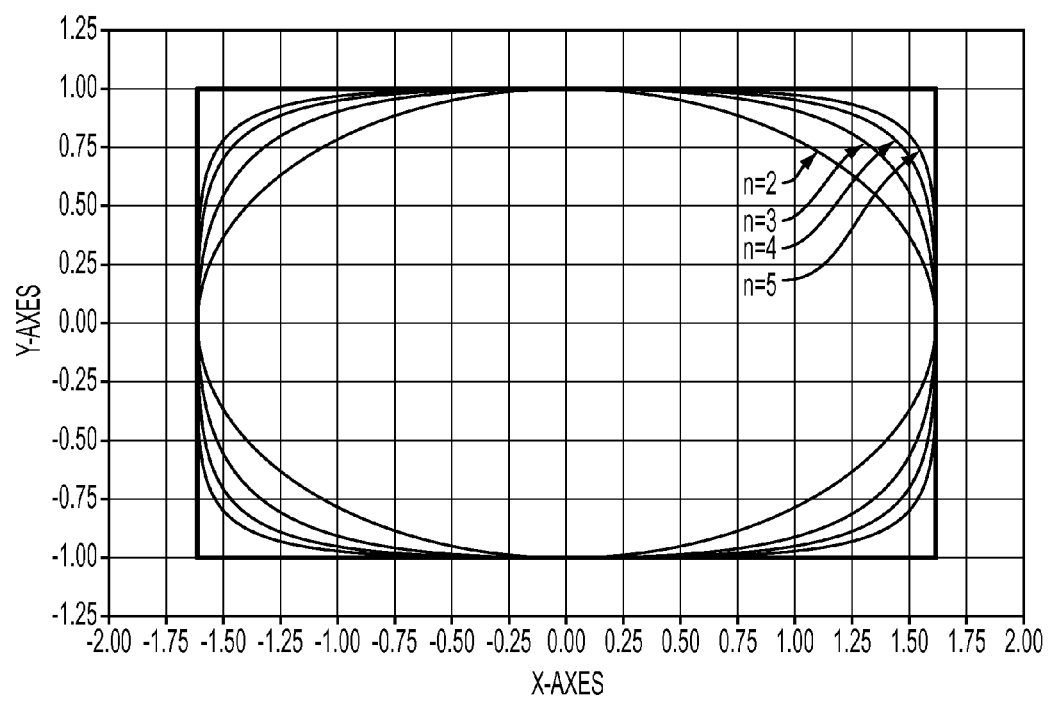
FIG. 2 illustrates several super ellipse curves within the same rectangular area, according to one or more embodiments.
Figure 10:
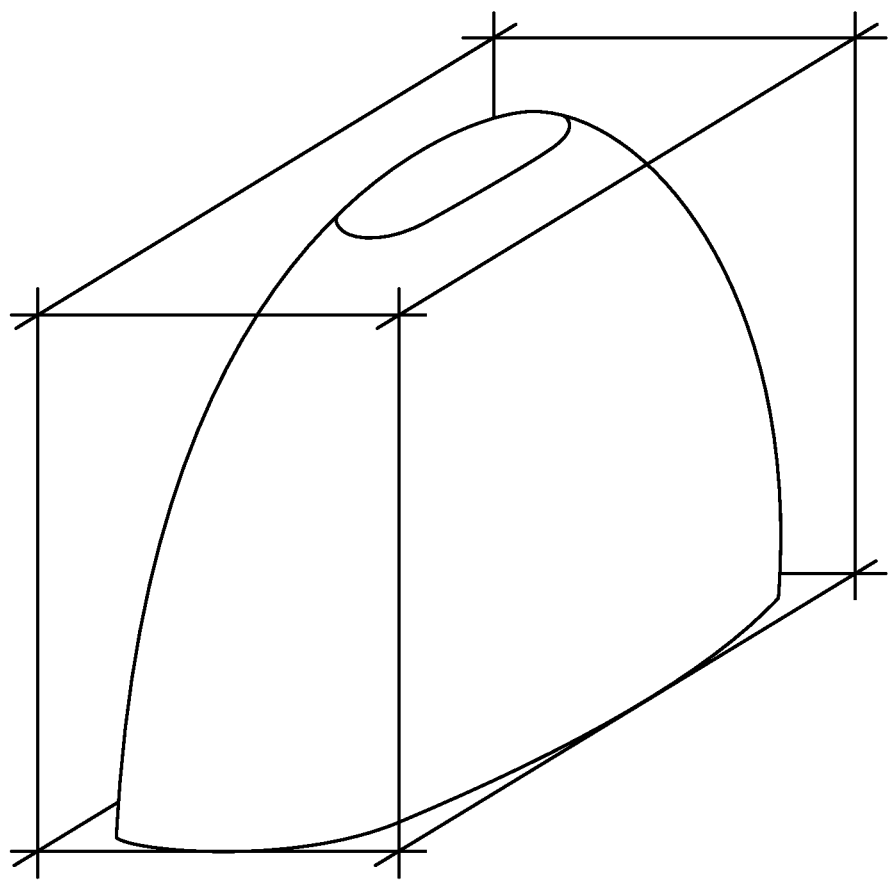
FIG. 10 illustrates a storage tank having a third power super elliptical horizontal cross-section and a truncated fourth power super elliptical vertical cross-section, according to one or more embodiments.

Accordingly, FIGS. 1A-D provide illustrations of an elliptical curve (FIG. 1A) and three super elliptical curves (FIGS. 1B-D), all drawn within a circumscribed golden rectangle, i.e., the golden rectangle is circumscribed around the super elliptical curves of FIGS. 1B-D, according to one or more embodiments. As another example, the below discussed FIG. 2 illustrates a golden rectangle circumscribed around the different illustrated super elliptical curves of FIG. 2, according to one or more embodiments. Referring back to FIGS. 1A-1D, the first curve FIG. 1A illustrates a conventional elliptical curve having exponents of n=2. The second curve FIG. 1B illustrates a super ellipse curve having exponents of n=3. Likewise, the third curve FIG. 10 illustrates a super ellipse curve having exponents of n=4, and the fourth curve FIG. 1D illustrates a super ellipse curve having exponents of n=5. This set of four curves demonstrates that super elliptical curves having integer exponents beginning with n=3 approach the shape or form of the enclosing rectangle as the exponent increases in value. If large cylindrical storage tanks were made having these curves as their horizontal cross sections, it can be qualitatively seen that super elliptical tanks having higher n-values would have large cross-sectional areas and would thus provide greater storage volumes.

FIG. 2 illustrates the same four curves of FIGS. 1A-D, all drawn within a same sized circumscribed golden rectangle. In this illustration the differences in areas becomes more apparent. For example, the areas of the four curves can be measured as shown below in Table 1.

TABLE 1

| Curve type | Exponent | Area (units$^2$) |
| --- | --- | --- |
| Ellipse | 2 | 5.08 |
| Super Ellipse | 3 | 5.72 |
| Super Ellipse | 4 | 6.00 |
| Super Ellipse | 5 | 6.15 |
| Rectangle | ∞ | 6.47 |

Figure 3:
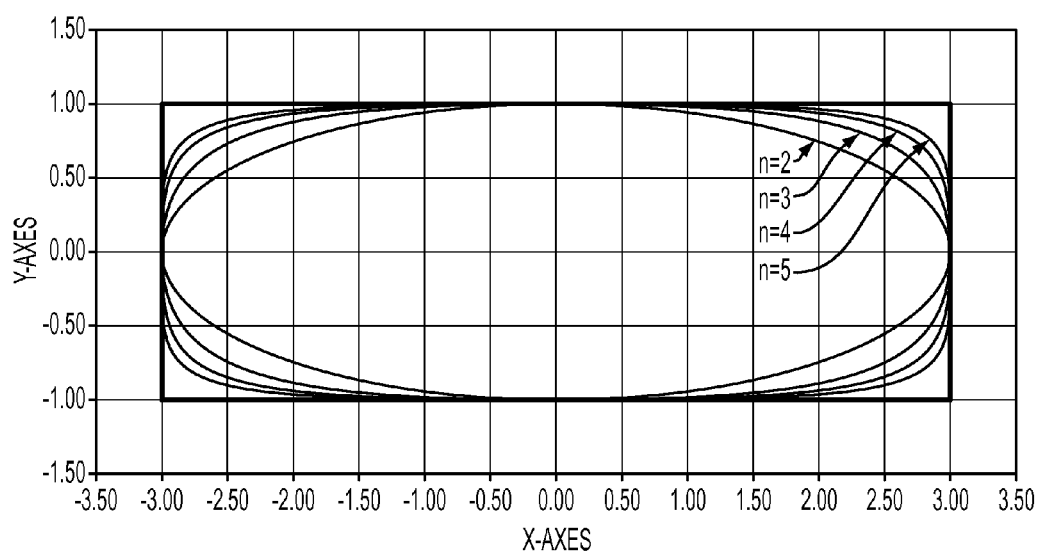
FIG. 3 illustrates several super ellipse curves within a same elongated rectangular area, according to one or more embodiments.

FIG. 3 illustrates the same four exponential curves of FIGS. 1A-D, plotted in an elongated rectangle measuring 3 units high by 6 units wide, according to one or more embodiments. The ratios of areas between the curves of the circumscribed rectangle remain the same. But, in terms of storage tank design, a problem becomes apparent at the top-center and bottom-center portions of the curves. All three super ellipse curves are nearly straight for about a third of the width of the rectangle. If these curves were used as the cross-sections of upright cylindrical liquid storage tanks, the storage tanks may have a propensity to bulge outward in these two regions and thus destroy the integrity of the storage tank; unless the storage tank(s) were significantly reinforced in these regions. The greater the exponent of the curve, the greater the problem of buckling at the widest portion of the storage tank. Also, proportionally, the more elongated the circumscribed rectangle is, the greater chance that the buckling problem will exist. For these reasons the golden rectangle may qualitatively appear to be about the greatest useful length to width ratio for the circumscribed rectangle without having to incorporate additional tank reinforcement.

Figure 4:
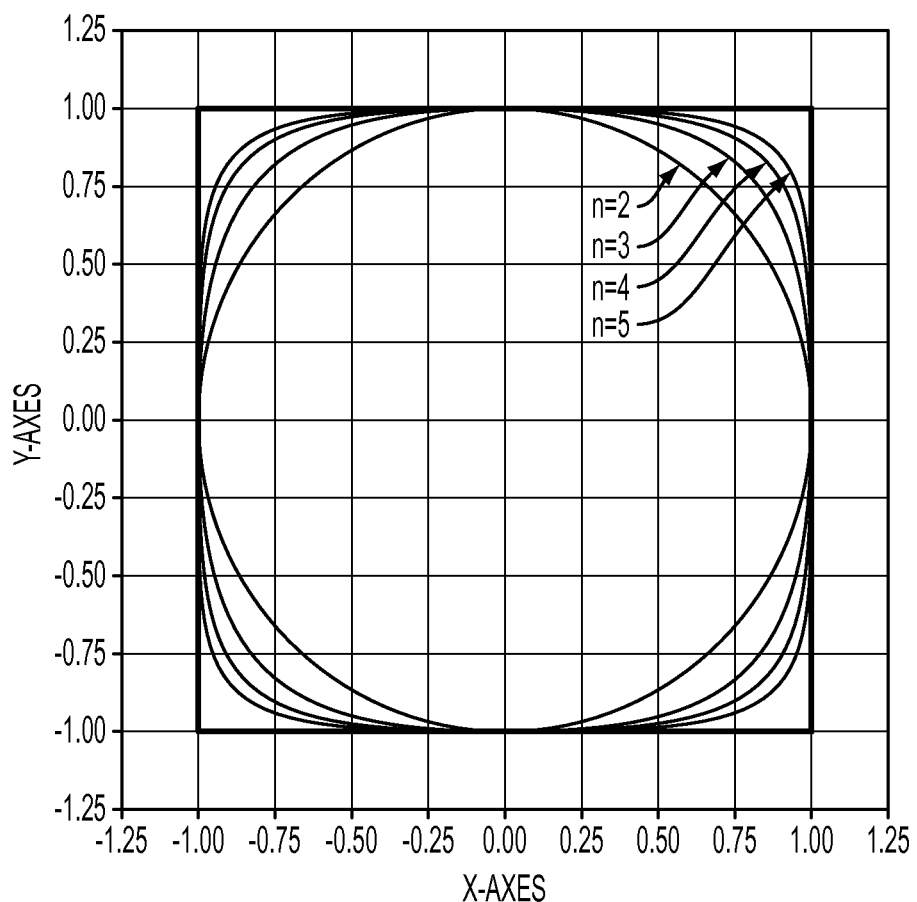
FIG. 4 illustrates several super ellipse curves within a same square area, according to one or more embodiments.

FIG. 4 illustrates the same four exponential curves of FIGS. 1A-D plotted inside a circumscribed square, according to one or more embodiments. In this case when n=2 the curve becomes a circle. The n=3, n=4, and n=5 curves then become super circles, again noted as being a particular type of super ellipse. The ratio of areas between the four curves and the circumscribed square remain the same as before; these ratios are independent of the values of a and b in Equation 7 for any Lamé curve. Most large storage tanks are currently circular in cross-section so future tanks based on the teaching herein may most likely have the cross-section of a super circle. For example, if a structural circular framework already exists for a system that uses large storage tanks, then when one or more embodiments described herein are incorporated into the existing structural framework the resulting storage tank embodiment may also be based on the circular based surrounding framework, and thus, have super circle cross-sections. All super elliptical curves have relatively flat portions of their curves at the center of each side, where the relatively flat portions extend for about one third of the side length. However, a super circle storage tank has a minimum surface area to volume ratio compared to all other super ellipsoidal tanks of the same volume. This gives the super circle design a structural advantage; it allows the super circle design embodiment to have a relative minimum wall thickness compared to all other super ellipse storage tanks that are designed within a rectangle. However, as indicated previously, storage tanks built within circumscribed rectangles, where their length to width ratios are equal to or less than that of a golden rectangle, should only require very minimum added wall thickness, if any.

Figure 5:
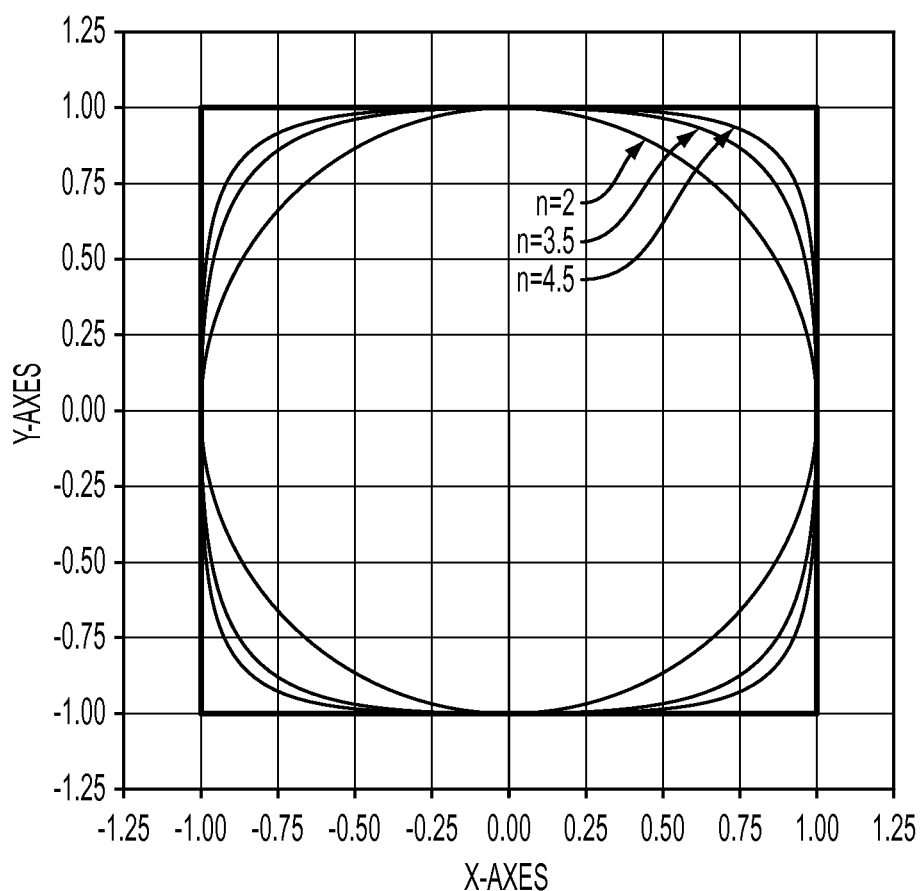
FIG. 5 illustrates several super ellipse curves having fractional exponents within a square area, according to one or more embodiments.

FIG. 5 illustrates two super circle curves inscribed in a square similar to FIG. 4, according to one or more embodiments. In FIG. 5, one super circle has n=3.5 and the other has an exponent of n=4.5. These plots illustrate that a super circle or a super ellipse do not need to have integer exponents; the exponent may be any positive number greater than two. This feature allows the tank cross-sectional curve to have any desired "squaring of the circle" to meet particular engineering requirements, e.g., for particular desired volumes while still using an existing structural framework.

Figure 6:
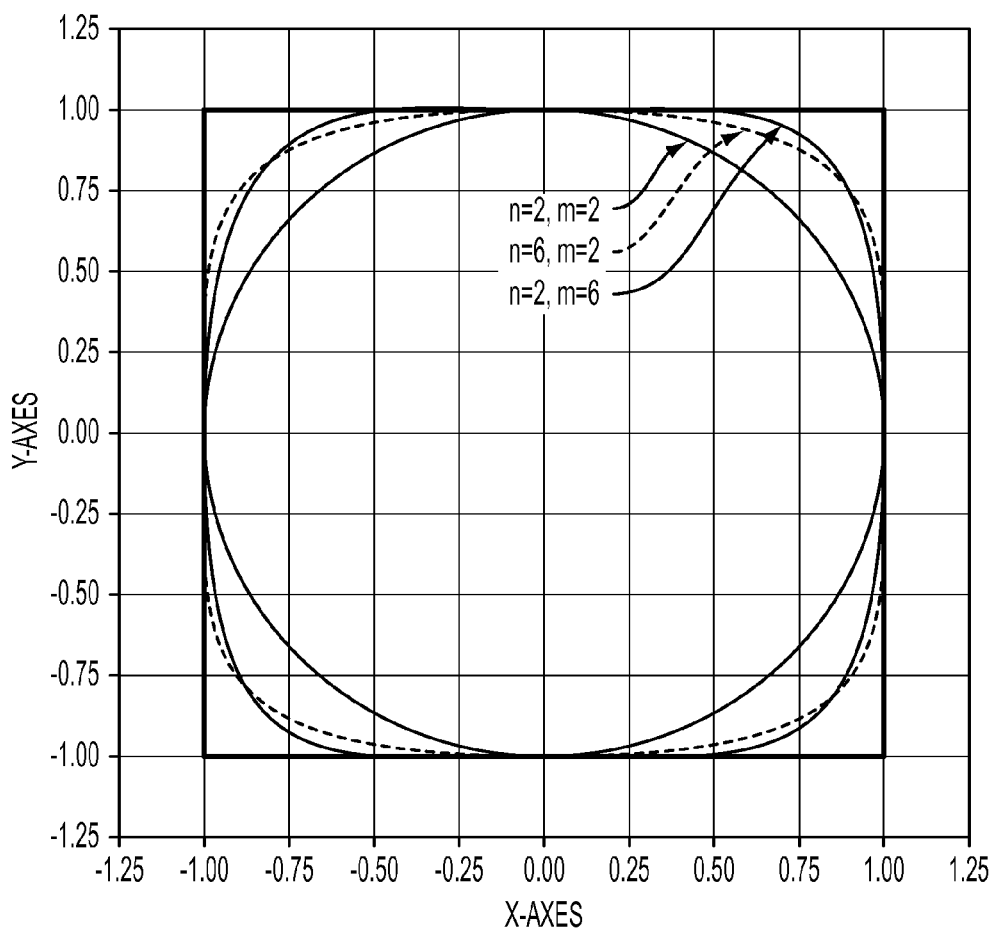
FIG. 6 illustrates distorted super ellipse curves having unequal exponents within a square area, according to one or more embodiments.

FIG. 6 illustrates another possible variation of a super ellipse curve, according to one or more embodiments. Normally the x and y terms, as well as the a and b terms, all have the same exponent, e.g., expressed as the letter "n" above. A possible variation would be to give the x and a terms an exponent n, and give the y and b terms a different exponent, such as "m", where both n and m have values of 2 or greater. This is shown below by Equation 9:

$$\frac{x^n}{a^n} + \frac{y^m}{b^m} = 1 \qquad \text{Equation 9}$$

The resulting curves shown in FIG. 6 are "distorted super ellipses", and in particular distorted super circle curves. The distortion is best seen when using a super circle drawn within a circumscribed square, as illustrated in FIG. 6. In FIG. 6, two distorted super ellipse curves are plotted between a circle and its circumscribed square. The three curves were given the following exponents, as shown below in Table 2.

TABLE 2

| Name | n | m | Description |
| --- | --- | --- | --- |
| Curve 1 | 2 | 2 | Circle |
| Curve 2 | 6 | 2 | Distorted Super Circle |
| Curve 3 | 2 | 6 | Distorted Super Circle |

Examination of the distorted super circles of FIG. 6 shows that in the case where the x and a terms are given a high exponent value of 6, the two vertical portions of the curve are square-like and the horizontal sections of the curve are more circle like. In the second curve, the y and b terms are given a high exponent value of 6 resulting in the opposite distortion; the vertical portions appear more circle-like and the horizontal portions are more square-like. These unequal exponents were applied to the special case of a super circle, but the teachings similarly apply to other distorted super ellipses, e.g., where the storage tank curves are plotted between an ellipse and a circumscribed rectangle.

This feature could prove useful for large chemical storage tanks having particular arrangements. For example, a number of super ellipsoidal storage tanks could be placed side-by-side in a row, and arranged so that the tanks were touching one another on their flat (high exponent) sides. This would prevent the tanks from bulging out on their wide flat sides thus allowing the side-by-side storage tanks to use thinner wall thicknesses.

In FIG. 7 the areas of a number of super ellipsoidal curves having exponents ranging from 2 to 8 are divided by the area of the circumscribed rectangle, according to one or more embodiments.

Figure 8:
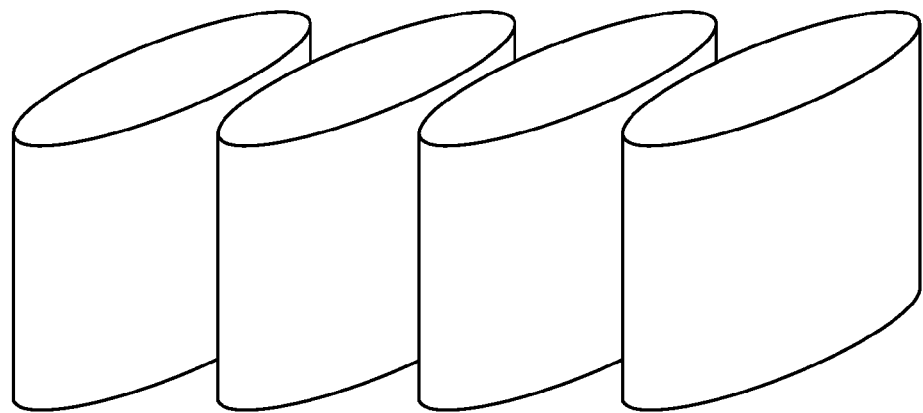
FIG. 8 illustrates four side-by-side storage tanks having an elliptical cross-section, according to one or more embodiments.
Figure 9:
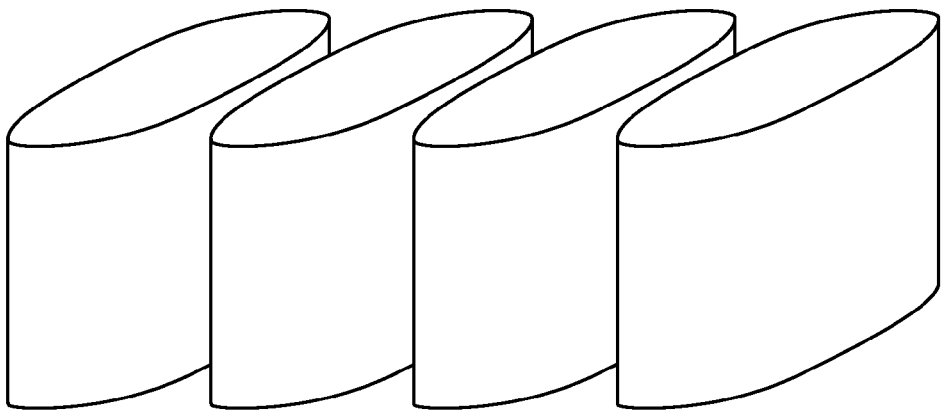
FIG. 9 illustrates four side-by-side storage tanks having a third power super elliptical cross-section, according to one or more embodiments.

FIG. 8 illustrates a simplified isometric drawing of four large chemical storage tanks, having ellipsoidal cross-sections, and arranged side-by-side in a row, but not touching one another. FIG. 9 illustrates a similar arrangement of large chemical storage tanks, where the tanks have super ellipsoidal cross-sections, for example, with super ellipsoidal exponents of 3, according to one or more embodiments. FIG. 8 and FIG. 9 together makes it visually evident that the super ellipsoidal storage tanks (FIG. 9) have greater storage capacity volume over tanks having the simple ellipse cross-section (FIG. 8). In one or more embodiments, the side-by-side tank placement could be arranged so that there is just enough room between the adjacent tanks to provide for maintenance requirements, for example.

FIG. 10 illustrates a storage tank having a third power super elliptical horizontal cross-section and a truncated fourth power super elliptical vertical cross-section, according to one or more embodiments. The storage tank may fit in the illustrated rectangular volume and is truncated at the top where it meets the top surface of the circumscribed rectangular volume. FIG. 10 illustrates that super ellipsoidal curves may be used to useful advantage in a design of the vertical sides of a large tank alternatively or in addition to super ellipsoidal cross-section. In this example the super ellipsoidal vertical sides give the storage tank greater strength than would be the case using straight vertical sides. For purposes of illustration the vertical curvature is exaggerated in FIG. 10; in practice such a reduction of volume due to the vertical curves may be kept under ten percent.

In many applications, and in particular in the use of large storage tanks to store electrolytes for redox flow batteries (RFBs), it may be desired to store a number of different chemicals. In the case of redox flow batteries there are typically equal amounts of positive and negative electrolytes that must be stored separately from one another. In some arrangements of RFBs it is desired to maintain charged and discharged electrolyte in different containers. Furthermore, in some RFB arrangements the electrolyte must pass through the battery stack several times before it is fully charged or discharged. For example, if three passes are required to charge the electrolyte, some fluid transfer methods store electrolyte with different charge levels in different storage tanks. So there are a number of applications where it is desired to store equal amounts of chemicals in different tanks. It may also be of advantage to make very large storage tanks that are subdivided by partitions into a number of equal storage volumes.

Figure 11A:
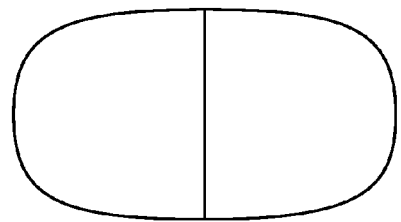
FIGS. 11A-H respectively illustrate eight different example approaches for dividing a tank having a super elliptical cross-section into equal volume sub-sections, according to one or more embodiments.
Figure 11B:
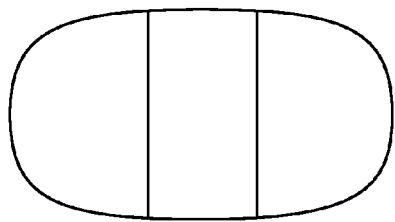
Figure 11C:
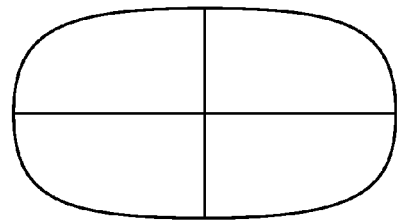
Figure 11D:
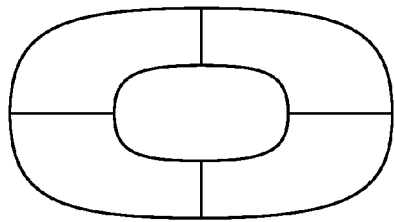
Figure 11E:
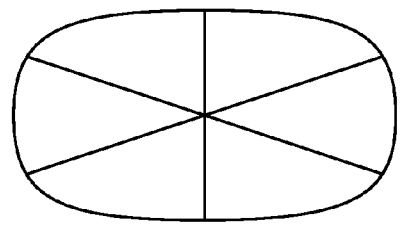
Figure 11F:
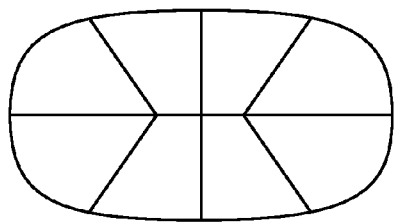

FIGS. 11A-H respectively illustrate eight different example approaches for dividing a super elliptical cross-section tank into equal volume sub-sections, according to one or more embodiments, whereby a super elliptical cross-section storage tank is divided into a number of equal, for example, volume compartments by the use of vertical dividers. FIG. 11A illustrates an approach where the storage tank is divided into two equal compartments by the use of a divider connecting the mid-points of the two long sides of the tank. Here, the storage tank could be divided by connecting the mid-points of the two shorter sides, or by cutting the tank in half along a diagonal, but illustrated embodiment of FIG. 11A may give the storage tank the greatest rigidity and strength, e.g., by minimizing the affects of the internal fluid pressures of the storage tank on along the longest side of the super elliptical cross-section of the storage tank. FIG. 11B illustrates an approach for dividing the storage tank into three equal volume compartments. FIG. 11C illustrates an approach where the storage tank is divided into four equal volume compartments, and FIG. 11D illustrates an approach where the storage tank is divided into five equal volume compartments. FIG. 11E and FIG. 11F illustrate approaches where the storage tank is divided into six and eight equal volume compartments respectively.

Figure 11G:
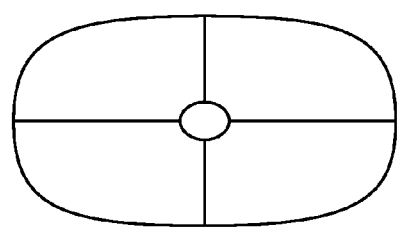
Figure 11H:
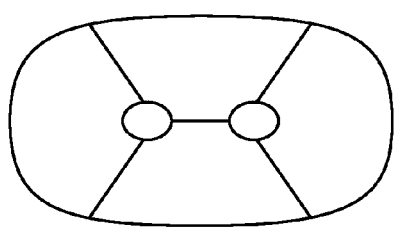

FIGS. 11G and 11H illustrate circular inserts or holes near the center of the storage tanks, which if extended into three dimensions would provide a cylindrical access cavity(s) that could be used to run plumbing, pumps, electrical utilities, sensors, and the like along the centers of the storage tanks. In addition, if these access cavities were large enough they could provide maintenance personnel access to equipment and utilities mounted inside the storage tanks. Both FIGS. 11G and 11H otherwise have example dividers arranged to divide the respective storage tanks into four equal volumes.

The storage tank designs of FIGS. 11A-H illustrate symmetrical approaches of dividing the storage tanks into equal portions while maintaining structural integrity, for example. The illustrated eight storage tanks all have a super ellipse cross-section with exponents of 3 and are all illustrated as being circumscribed within golden rectangles. In each example storage tank of FIGS. 11A-11H the tank area/volumes were designed to be equal.

Figure 12A:
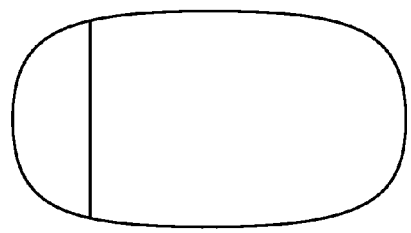
FIGS. 12A-F respectfully illustrate six different example approaches for dividing a tank having a super elliptical cross-section into un-equal volume sub-sections, according to one or more embodiments.
Figure 12B:
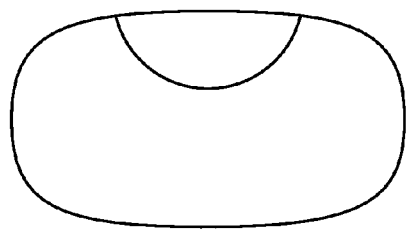
Figure 12C:
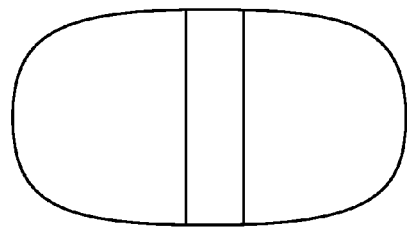
Figure 12D:
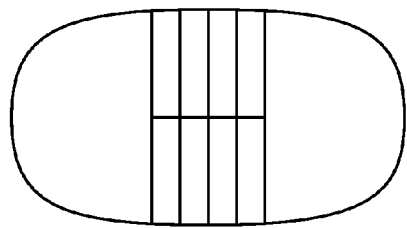
Figure 12E:
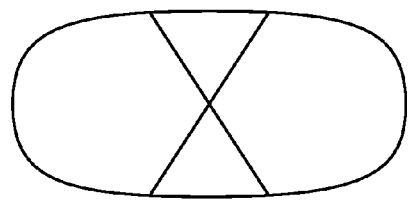
Figure 12F:
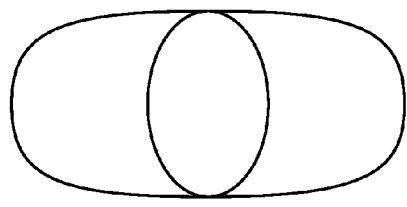

FIGS. 12A-12F respectfully illustrate six different example approaches for dividing a super elliptical cross-section tank into un-equal volume sub-sections, according to one or more embodiments. As in FIG. 10, the super elliptical storage tank divisions in FIGS. 12A-12F may be designed so as to maintain and reinforce the structural integrity of the storage tanks. FIG. 12A illustrates an approach where the storage tank is divided into two unequal volumes by placing a divider straight across a short width of the storage tank at a position that gives the desired volume ratios between storage tank partitions. FIG. 12B illustrates another approach where the storage tank is divided into two unequal volumes using a curved divider, shown as reinforcing one long length the storage tank. FIG. 12C illustrates an approach where a storage tank is divided into two equal volumes and a third unequal volume. Clearly the center volume could be smaller or larger than the two side volumes depending on the placement of the dividers. Also, a similar approach could be used to subdivide the storage tank into a number of unequal volumes depending on the number and placement of dividers. For example, the approach shown in FIG. 12D includes adding both vertical dividers and a single horizontal divider. In this case the five parallel dividers are shown to be of equal spacing and arranged to divide the center portion of the storage tank into eight equal portions while also generating two larger volumes on the right and left sides of the storage tank. FIG. 12E illustrates an approach where a super ellipsoidal storage tank is divided into four volumes; two equal small volumes and two equal larger volumes. Lastly, FIG. 12F illustrates an approach where a super ellipsoidal storage tank is divided into three volumes; two larger volumes and one smaller volume along the center of the storage tank. In this approach the dividers may be curved in a form of an ellipse to provide greater structural rigidity along both the long and short sides of the storage tank. The illustrated examples of dividing a super ellipsoidal tank into two or more unequal volumes in the FIGS. 12A-F may be designed to maintain a maximum of symmetry in order to maintain and reinforce structural integrity of the respective storage tanks, for example.

Figure 13:
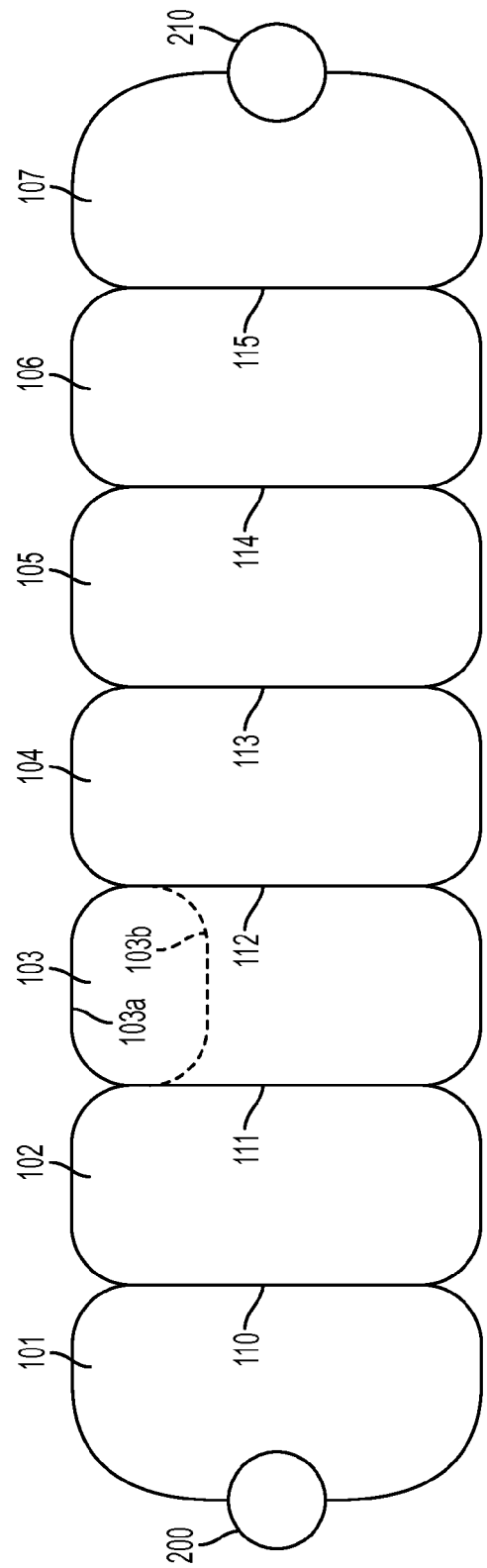
FIG. 13 illustrates a compact multiple storage tank arrangement using super ellipse curves, according to one or more embodiments.

FIG. 13 illustrates a compact multiple storage tank arrangement using super ellipse curves, according to one or more embodiments. FIG. 13 demonstrates a more complex use of super ellipsoidal storage tank shapes/forms for a practical design application, such as for multiple storage tanks in a redox flow battery, as only an example. In this horizontal cross-sectional view, seven large storage tanks 101-107 of equal volume may be combined to form a string of storage tanks that may have no space between the storage tanks. In FIG. 13, the top and bottom of each storage tank 101-107 may be designed to be respective halves of a super ellipsoidal curve. In the top portion of storage tank 103 a full super ellipse curve edge (103a and 103b) is shown by way of illustration. The upper and lower curved portions of each storage tank FIG. 13 may be connected by straight divider elements; numbered 110, 111, 112, 113, 114, and 115 in FIG. 13; that also serve as the walls between adjacent storage tanks. The left end tank 101 and right end tank 107 are caped off with larger super ellipse curved portions which cause the end tanks to bulge out and include greater volume then the other tanks. Two smaller circular, for example, cross-section storage tanks 200 and 210 respectively partly cut into the outer wall of the end tanks 101 and 107 and partition away some of the internal volume of the end tanks 101 and 107. Dimensions of the storage tank 200's circular cut-out volume and the remaining bulge volume of storage tank 101 may be designed so that the end tank 101 has a same volume as the other five storage tanks 102, 103, 104, 105, and 106. Similarly, the storage tank 210 and end tank 107 may be designed so that end tank 107 has the same, meaning substantially the same, volume as the other five storage tanks 102, 103, 104, 105, and 106. The super ellipse curves used to form the upper and lower portions of each storage tank in FIG. 13, and super ellipse curves used to cap the end tanks 101 and 107 in FIG. 13, may all be super ellipse curves, e.g., having exponents of 3, and may be within respective circumscribed golden rectangles.

Figure 14:
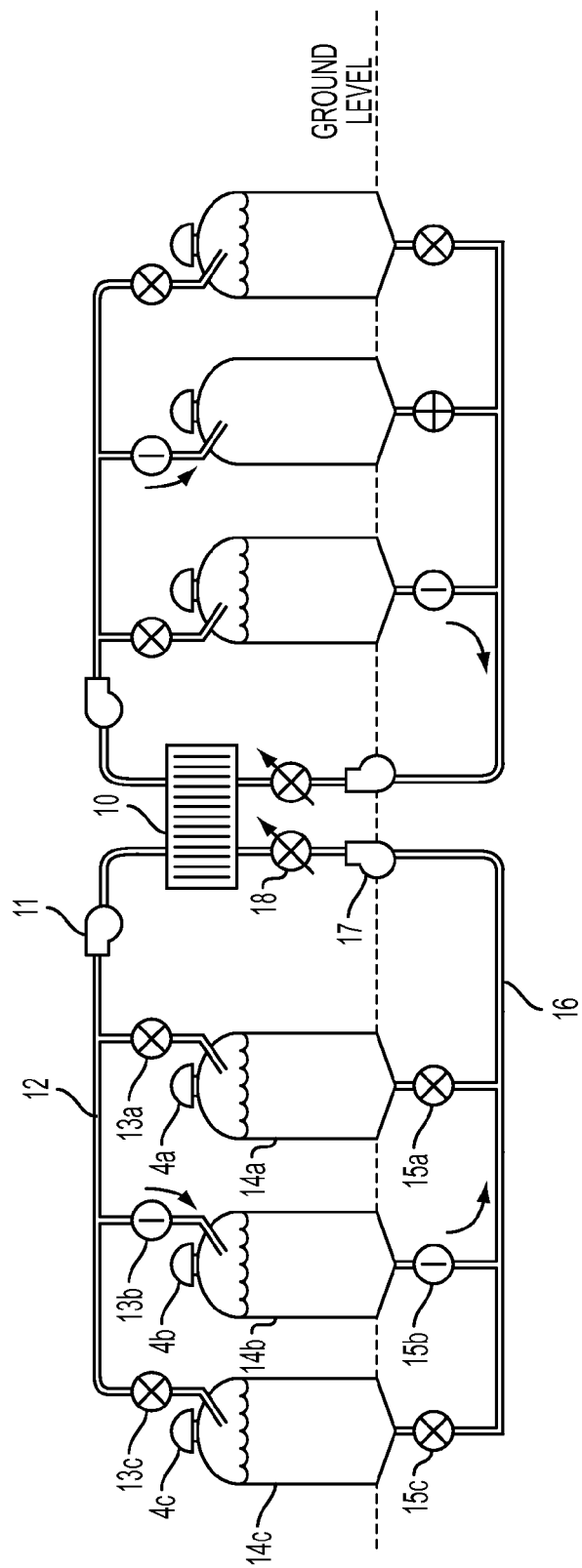
FIG. 14 illustrates an example redox flow battery, according to one or more embodiments.

This arrangement of a string of equal volume storage tanks in FIG. 13 may have particular application in a redox flow battery, such as the redox flow batteries of FIG. 14. In such an application, one string of storage tanks, such as shown in FIG. 13, may contain positive electrolyte in various stages of charge, and another similar set of storage tanks similar to storage tanks 101-107 may contain negative electrolyte in various states of charge, such as also shown in FIG. 14. In this application these compact strings of tanks may be housed in temperature controlled indoor environment, where three-dimensional space is generally at a premium. The two circular end tanks 200 and 210 of FIG. 13 may contain electrolyte and/or gas under relatively higher pressure, e.g., to assist in the hydraulic movement of electrolyte between tanks and through the battery stack. For example, the end tank 200 may be referred to as a booster tank, designed to be used to generate a booster pressure in any of the storage tanks 101-107 sufficient to force the liquid electrolyte stored in a select storage tank, of storage tanks 101-107, from the select storage tank through the first half-cell. In this embodiment, the storage tanks may be fabricated from acid resistant polypropylene and mounted on large steel frames. Each storage tank may have mounting provisions molded into the tanks, for example, to allow them to be bolted together and to the steel frames, or there may otherwise be some mechanisms to attach the respective storage tanks together and/or to their environment.

The storage tanks, and corresponding arrangements, of FIG. 13 may represent an efficient approach for storing large amounts of water, chemicals, fuels, or the like in locations where ground or floor space is expensive and/or limited. From an engineering point of view a super ellipse designed within a golden rectangle would appear to offer a minimum loss of structural strength; e.g., well within the normal engineering tolerance for an equivalent circular cross-section of a storage tank. Lastly, the use of super ellipsoidal geometries in the design of storage tanks, and in particular the use of Lamé curves within circumscribed golden rectangles, may also provide elegant and aesthetically pleasing arrangements of storage tanks, that may otherwise be an eyesore.

As noted above, the storage tank arrangement of FIG. 13 may be implemented in a flow battery, with two or more such strings of storage tanks. Flow batteries represent a system where, when a positive electrolyte is provided to a positive inlet of a battery stack, or battery cell of such a battery stack, and a negative electrolyte is provided to a negative inlet of the battery stack, the flow battery may provide power when the provided positive and negative electrolytes are charged electrolytes and the flow battery may be capable of storing power when the provided positive and negative electrolytes are discharged electrolytes. Accordingly, flow batteries may be ideal for large scale power providing and storing applications. The size of the battery stack(s) within the flow battery may be particularly designed to meet the maximum power requirements of a particular application and the quantity of electrolyte in the storage tanks can be specified to meet the required hours of operation, such that a more efficient storage tank that can hold large amounts of electrolyte, e.g., and not need additional reinforcement, would be desirable. Accordingly, a flow battery embodiment with one or more super elliptical shaped storage tanks may provide the capability to store more electrolyte in respective physical spaces than would be conventionally available and could provide more hours of operation than a circular or elliptical storage tank. For example, in one or more embodiments, an all-vanadium redox flow battery could be fabricated using 100 10,000 watt battery stacks to provide the capability of providing a megawatt of electric power. In one or more embodiments, such a flow battery could be provided with storage tanks containing 12,500 gallons of 1.56 molar electrolyte and designed to have at least one super elliptical side, which would give the flow battery sufficient electrolyte to operate for one hour. The flow battery could be increased to provide one megawatt of power for eight hours by simply increasing the amount of electrolyte by eight times, while making no changes to the battery stacks. This design flexibility makes flow batteries ideally suited for storing power for large installations, such as the entire electric output of a wind farm or solar array. In these types of applications the flow battery may be designed to store electric power at the time it is generated by these intermittent sources of power and releasing it to consumers during the times of day when it is needed. Large scale flow batteries according to one or more embodiments also have applications in supplying back-up power, power leveling, grid voltage and/or frequency regulation, spinning reserve, load shifting, and other applications. Similar to the above noted conventional elliptical approaches, though less common, storage tanks in flow batteries that hold substantial amounts of positive or negative electrolytes, e.g., in an acid form, are equally conventionally round, so as to form a column with a circular cross-section.

Accordingly, one or more embodiments relate to flow batteries, such as Reduction-Oxidation (Redox) Flow Batteries, also known as regenerative fuel cells, or reversible fuel cells, or secondary fuel cells. Further, one or more embodiments may relate to flow batteries having multiple positive and negative electrolyte storage tanks designed to have at least one super elliptical storage tank, for example, side and approaches for distributing electrolyte between such multitude of storage tanks and one or more battery stacks. Briefly, as only an example, herein a "battery stack" may refer to a collection of "battery cells", e.g., bolted together in the shape of a rectangular volume. Each battery cell may include a positive and negative "half cell" on either side of a membrane of that battery cell, for example. In one or more embodiments, apparatuses and/or methods take into account running pumps at appropriate speeds to move electrolyte through the battery stack(s) and storing corresponding respective electrolytes having potentially several different States of Charge (SOC) in several different storage tanks, based on one or more of the storage tanks being designed to have one or more super elliptical sides. In one or more embodiments, approaches for controlling the distribution of electrolytes between strings of multiple storage tanks and respective battery stacks are also provided. Herein, a "tank farm" is a term meaning a string of multiple storage tanks configured to store positive and/or negative electrolytes for provision to at least one particular battery stack or battery bank of a plurality of battery stacks, or multiple separate strings of such storage tanks configured to respectively store positive and/or negative electrolytes for provision to a respective one or more particular battery stacks or battery banks. In one or more embodiments, one or more of the storage tanks are designed so as to be arranged in such a tank farm so as to provide larger volumes of electrolyte than circle or elliptical cross-sectioned storage tanks and designed based on their respective physical interactions with each other.

As only an example, FIG. 14 illustrates a multi-tank flow battery system and method, according to one or more embodiments. In this particular example three storage tanks are shown on each side of the battery stack 10, one or more or all of the storage tanks may be designed to have at least one super elliptical side. Briefly, in or more embodiments, battery stack(s) 10 may also be symbolically representative of an entire battery bank which may contain one or more strings of battery stacks. The storage tanks and components on the positive side (illustrated left side of FIG. 14) of the flow battery of FIG. 14, of the battery stack 10 contain positively charged electrolyte and storage tanks on the negative side (illustrated right side) of the battery stack 10 contain negatively charged electrolyte. Currently charged or discharged electrolyte may be drawn from battery stack 10 by pump 11, for example, so as to be provided along pipe-line 12 and returned into any of the positive storage tanks 14a, 14b, or 14c, depending on the respective settings of valves 13a, 13b, or 13c. Similarly, stored electrolyte may be caused to respectively exit the positive storage tanks 14a, 14b, or 14c toward the battery stack 10 through respective valves 15a, 15b, or 15c and along pipe line 16. Electrolyte from pipe line 16 may be pumped into the battery stack 10 by pump 17, for example, while a rate of flow of electrolyte into the battery stack 10 may be controlled by variable valve 18 and/or a controlled speed of pump 17.

In the example of FIG. 14, valve 15b may be in the open position allowing electrolyte stored in storage tank 14b to enter the output line 16 where pump 17 sends the electrolyte into the battery stack 10 for either charging or discharging of the electrolyte based on whether this flow battery of FIG. 14 is in a corresponding charging or discharging mode. Pump 11 may then cause the positive electrolyte to return from the battery stack 10 and back to the same storage tank it came from, i.e., storage tanks 14b.

Here, a similar circulation approach as the above discussed positive side of the flow battery may also be implemented on the negative side (illustrated right side of FIG. 14) of battery stack(s) 10. Alternatively, the approach discussed below regarding the illustrated operation of the negative side of the flow battery may also be implemented on the positive side of the flow battery. As a further alternative, different circulation approaches may be implemented on the different sides of the flow battery, as currently illustrated in FIG. 14.

As noted, the negative side of the flow battery of FIG. 14 illustrates an approach where one or more of the storage tanks may be empty at some point during the discharging or charging of the electrolytes. Briefly, as only an example, such storage tanks may be designed to self-reinforce themselves, when separate from other storage tanks or in contact with another storage tank that may be full of electrolytes, by having super elliptical lateral sides and potentially selectively placed dividers, such as shown in FIGS. 9-13. All storage tanks may similarly be designed to self-reinforce, or one or more of the storage tanks on the negative side of the flow battery may be designed differently from one or more storage tanks on the positive side of the flow battery. Regardless, on this negative side of the flow battery of FIG. 14, with the center tank initially being illustrated as being empty, the negative electrolyte exiting the left adjacent storage tank will be caused to transit through the battery stack(s) 10 and will then be returned to the empty central tank. Here, when all electrolyte from the left adjacent storage tanks has transited the battery stack(s) 10 and deposited in the previously empty central storage tank, the left adjacent storage tank will then become the empty storage tank. This illustrated circulation approach of the negative side of the flow battery of FIG. 14 may result in charged electrolyte from the battery stack(s) not being mixed with the discharged electrolyte still stored in a storage tank, or may not mix discharged electrolyte from the battery stack(s) with the charged electrolyte still stored in a storage tank. As noted above, the illustrated circulation approach in the positive electrolyte side of the flow battery of FIG. 14 may differently result in such mixing of charged and discharged electrolytes. Either of the illustrated circulation approach of the positive side and the illustrated circulation approach of the negative side may be selectively implemented based upon the application and design of the flow battery, as the different circulation approaches have different respective benefits and drawbacks. Here, one or more storage tanks, including any storage tanks that may become empty through the operation of the flow battery, may be designed to be self-reinforcing, e.g., when separate from other storage tanks or in contact with another storage tank that may be full of electrolytes, by having super elliptical lateral sides and potentially selectively placed dividers, such as shown in FIGS. 9-13. The term self-reinforcing is meant to mean that the shape of a particular storage tank can be maintained independent of whether the particular storage tank is full or empty, or independent of whether adjoining storage tanks are full or empty.

Though not limited thereto, redox flow battery storage tanks may generally have top and bottom portions, where electrolyte returned from a battery stack to a storage tank may enter at the top portion of the storage tank and where electrolyte may exit toward the battery stack from the bottom portion of the storage tank. For example, each of the illustrated storage tanks of FIG. 14 is illustrated as having an inlet at the top portion and an outlet at a bottom portion. The flow battery operates by moving charged or discharged electrolyte, for example, from one or more storage tanks, through the battery stack. The configuration of such inlets and outlets of each storage tank may be based on the design of the storage tank, such as if the top side, bottom side, or one or more lateral sides is designed to have include a super elliptical shape. The tops of one or more the storage tanks may also include a collection of devices, which may collectively be referred to as a "snorkel". The snorkel may serve to equalize pressure in one or more storage tanks with an outside atmosphere, for example, while also helping to prevent atmospheric oxygen from coming in contact with an electrolyte inside the storage tank, e.g., to avoid oxidation of the electrolyte. A snorkel may also be configured to allow accumulated hydrogen gas and/or oxygen gas to escape from inside the battery stack; help to maintain electrolyte(s) in one or more storage tanks at a desired temperature; prevent contaminants from entering such storage tanks; and other applications as appropriate. As only an example, respective snorkels may be selectively configured and placed based on whether the top side or one or more lateral sides is designed to have a super elliptical shape, for example.

Example bottoms of the storage tanks are pictured in FIG. 14 as having a funnel shape leading to an output line, e.g., at a bottom portion of the respective storage tank, though embodiments also include the bottom side of the storage tanks being designed to have super elliptical shapes. Other configurations are possible whereby an output line pulls electrolyte from the lowest point inside the storage tank, e.g., using a pump. This approach may prevent the possible buildup of particulates and impurities at the bottom of the storage tank. In one or more embodiments, a filtering device may be installed elsewhere at some convenient place in the plumbing, e.g., at a convenient access point, to control the existence of such participants and impurities. If the storage tanks are large, their bottoms may be resting on the ground; or slightly below ground level within a containment structure to prevent accidental spills from contaminating the environment. Within a building the ground level may be the floor level, for example. In one or more embodiments, the storage tanks may also be elevated above or placed below such a ground or floor level. The placement of the storage tank on, above, or below ground level may be a determining factor in whether the bottom side of the storage tank is designed to have a super elliptical shape. For example, FIG. 10 illustrates an example where the bottom side of the storage tank may be flat, because the ground is providing substantial forces against the corresponding bottom side that no reinforcement may be necessary for the bottom side, though the need for reinforcement of the lateral sides may also be avoided when the lateral sides are formed to have super elliptical forms, such as in FIGS. 1B-6 and 9-13.

Briefly, though FIG. 14 explains a described system and method according to one or more embodiments with only limited example components, the embodiments are not limited to the same. Rather, several or many additional components and features may be included, such as drainage valves, safety and pressure relief valves, heat exchangers, and other components and sensors that may make up a redox flow battery, as well as different storage tanks having different forms, including at least one storage tank that is designed to have at least one super elliptical side, as discussed above. The string of storage tanks illustrated in FIG. 14 could also be implemented using any of the divided portions of one or more super elliptical storage tanks, such as shown in FIGS. 11A-12F, or the generation of the differing storage tanks through the use of divided portions of a super elliptical storage tank, such as shown in FIG. 13.

In addition, one or more storage tanks used in one or more of approaches described herein may physically be a separate storage tank that is not physically part of the string of equal volume storage tanks that store the electrolyte in the redox flow battery, and may even be a storage tank not part of the tank farm that may include the string of storage tanks, such as the string of storage tanks shown in FIG. 13. For example, a "facilitator tank" may be differently located closer to the battery stack(s), e.g., to minimize pumping requirements, and either (or both) of the facilitator tank and one or more remaining storage tanks may have at least one super elliptical designed side. Using FIG. 14 as an example, the illustrated storage tanks 14c and 14b may be remotely located, resulting in storage tank 14a potentially being used as a facilitator tank that is local the battery stack(s) 10. For example, the facilitator tank may be located above, below, or directly beside the battery stack and may have a different appearance than the other electrolyte storage tanks or be larger than the other storage tanks. In very large redox flow batteries where the electrolyte tank farm covers considerable real estate it may be expedient to have two facilitator tanks on either of the positive or negative sides, or both positive and negative sides, of the flow battery. In this configuration electrolyte can be pumped in from a distant location, passed once through the battery stack then transferred into a first facilitator tank. Thereafter the volume of electrolyte could be transferred back and forth between the two facilitator tanks and through the battery stack(s) until the desired SOC percentage is reached; after which the resulting electrolyte may be returned to the same remote storage tank that provided the electrolyte, and the next remote storage tank may then be used in a similar manor.

As only an example, in one or more embodiments, the flow battery may be an all-vanadium redox flow battery (VRFB). In such a VRFB, the positive electrolyte contains VO2+ ions, which undergo a reduction reaction to VO2+ plus electricity during its discharge cycle. The opposite oxidation reaction takes place during the charging of the VRFB, where VO2+ ion plus electricity are transformed back to VO2+ ions. In the negative electrolyte V2+ ions undergo an oxidation reaction to yield V3+ ions plus electricity during its discharge cycle. During the charging cycle V3+ ions plus electricity in the negative electrolyte is reduced back to V2+ ions. Herein, these four vanadium valence states can be written as V(5), V(4), V(3), and V(2). The charge/discharge states in the positive electrolyte may be represented as V(5)/V(4) and the charge/discharge states in the negative electrolyte may be be represented as V(2)/V(3).

Still further, in one or more embodiments, the example concepts of the flow battery systems described herein include all types of flow batteries such as iron/tin, iron/titanium, iron/chrome, sodium/bromine, zinc/bromine, and other possible reactant couples. One or more embodiments include an all vanadium flow battery (where the positive reactant couple is $VO_2^+/VO^{2+}$ and the negative couple is $V^{3+}/V^{2+}$), and the all chrome redox flow battery (where the positive couple is $Cr^{5+}/Cr^{4+}$ and the negative couple is $Cr^{3+}/Cr^{2+}$), and other single element redox flow batteries.

One or more embodiments should not be considered limited to the specific examples described herein, but rather should be understood to cover many aspects of the invention. Various modifications, equivalent processes, as well as numerous structures and device substitutions may be readily available.

The storage tanks may be made of high density polyethylene, lined metal, flexible rubber-coated fabric, or acid resistant materials that can withstand pressure or containment requirements, noting that the storage tanks are not limited to such example materials. For example, if the storage tanks store electrolyte, e.g., for a redox flow battery, the storage tank may be made of acid resistant high density polyethylene (HDPE) storage tanks. In addition, it is not intended that the storage tanks described in this disclosure be limited to the descriptions provided in the drawings. Accordingly, the storage tanks may be positioned horizontally or vertically. They need not be resting on the ground; they may instead be positioned above or below ground level within the limits set by their function. The storage tanks may have any designed volume, e.g., commensurate with their function. For example, the storage tanks may be sized in accordance with the over-all size of the flow battery system and the designed flow rates in the flow battery, e.g., a designed volume so that a storage tank has at least one super elliptical side. As noted above, the storage tanks may be housed indoors or outdoors.

As noted above, the storage tanks may be self-reinforcing, or be mounted within a supporting structure. The storage tanks would generally be mounted on, or be surrounded by, a containment tray, or catch basin, or other mechanisms to prevent electrolyte leaks or spills from entering the environment. The bottoms of the storage tanks may funnel the fluids to the output plumbing, or be flat, or have any other shape determined by function or design, including a super elliptical form. The storage tanks may include heating elements or cooling mechanisms as required and may be housed outdoors or indoors, for example. The storage tanks may have multiple input and output mechanisms, access ports, viewing ports, sensor attachment mechanisms, and other accessories. Several storage tanks may be designed as a single multi-chambered structure to save space, with different chambers being defined by the example dividers such as in FIGS. 11-12F and 13, or clustered together with other storage tanks or components, such as in FIG. 9.

In the illustrated super ellipse storage tanks in the drawings, the storage tanks may be drawn as oriented vertically. However, the storage tanks may be orientated horizontally, or in any other orientation that an application may require/desire. The storage tanks are shown to be fixed to the floor or ground, but they may instead be mounted on trucks, trains, ships, or other vehicles or mobile means. They may be installed in underground facilities, or be buried underground, such as underground fuel tanks. In addition, the storage tanks need not be cylindrical in their vertical dimension; they may be tapered, or have curved super ellipse segments as shown in FIG. 10, or have any other symmetrical or non-symmetrical shape. They may be positioned horizontally or vertically. The storage tanks may be available for storing water, oil, electrolytes, other chemicals, etc., and the storage tanks may each be independent structures, they may include a clustering of multiple storage tanks that may or may not touch each other, or they may be derived from a division of a larger storage tank where any of the larger storage tank and/or divided smaller storage tanks may include one or more super elliptical sides or shapes.

Still further, arrangements of components of such a flow battery shown in FIG. 14 and expressed in the descriptions herein generally shows symmetry between the positive and negative sides of the flow battery or symmetry of components with or without symmetry in electrolyte circulation approaches between the two sides. For example, different reactant chemistry on each side of the flow battery may make it advantageous to employ different circulation approaches on the two sides of the flow battery, and such different circulation approaches may merely be variations of the FIG. 14 illustrated positive side electrolyte circulation approach where charged/discharged electrolytes are mixed also on the negative side, merely variations of the FIG. 14 negative side electrolyte circulation approach where charged/discharged electrolytes are not mixed, or merely different variations of the differently illustrated circulation approaches of FIG. 14, with either of the positive or negative sides implementing the illustrated positive electrolyte circulation approach, or a variation of the same, or with either of the positive or negative sides implementing the illustrated negative electrolyte approach, or a variation of the same. In addition, the quantity of positive electrolyte may differ from the negative electrolyte potentially necessitating a difference in scale between the two sides of the flow battery. Such differences in scale may merely be the increasing of storage space with the same super elliptical exponents or the different storage tanks may be differently designed by having storage tanks on one side correspond to different super elliptical exponents than storage tanks on the other side of the flow battery. For these and other possible reasons, in one or more embodiments the design of the flow battery may be asymmetric. Regardless of symmetry, above described aspects of the present invention may be applied to any symmetric or asymmetric flow battery arrangement, of any workable size, scale, or configuration as appropriate.

While aspects of the present invention has been shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A storage system for storing fluids, comprising:
   a first storage tank having an internal first volume defined by one or more exterior sides of the first storage tank being designed to have a super elliptical shape circumscribed by a rectangle or square so that the internal first volume is greater than an internal volume of a storage tank designed to have an elliptical or circular shape circumscribed by the rectangle or the square,
   wherein said first storage tank has at least one input port and at least one output port, and
   wherein fluid within said first storage tank is circulated using said at least one input port and said at least one output port.

2. The system of claim 1, wherein a super circular shape, the super elliptical shape, the elliptical shape, and the circular shape are respectively defined by different Lamé curves, with the Lamé curves being defined according to:

$$\frac{x^n}{a^n} + \frac{y^m}{b^m} = 1,$$

wherein the super circular shape is a type of the super elliptical shape and is defined by the exponents n and/or m being greater than 2 and a=b, the super elliptical shape is defined by the exponents n and/or m being greater than 2 and a≠b, the circular shape is defined by the exponents n and m being 2 and a=b, and the elliptical shape is defined by the exponents n and m being 2 and a≠b.

3. The system of claim 2, wherein the first storage tank is a cylinder designed to have a super elliptical cross-section so that more area within the rectangle or square is used to store fluids in the first storage tank than an area within the rectangle or square that would be used if the first storage tank was designed to have an elliptical or circular cross-section.

4. The system of claim 3, wherein, when m and n are 3, the more area within the rectangle or square used to store the fluids in the first storage tank is at least 9% greater than the area that would have been used if the first storage tank was designed to have the elliptical or circular cross-section.

5. The system of claim 2, further comprising a string of storage tanks, including the first storage tank and a second storage tank, with both of the first and second storage tanks being designed to have at least one respective super elliptical shaped side.

6. The system of claim 5, wherein the first storage tank and the second storage tank have a same designed internal volume based on the at least one respective super elliptical shaped side.

7. The system of claim 5, wherein the first storage tank and the second storage tank are designed to store liquid electrolyte for a flow battery system.

8. The system of claim 5, wherein plural storage tanks, including the first storage tank and the second storage tank, of the string of storage tanks are designed to have super elliptical cross-sections and are arranged adjacently in a tank farm that includes plural strings of storage tanks.

9. The system of claim 8, wherein one of the plural strings of storage tanks is designed to store a positive electrolyte and be connected to a positive side of a battery stack of a redox flow battery and another of the plural strings of storage tanks is designed to store a negative electrolyte and be connected to a negative side of the battery stack of the redox flow battery.

10. The system of claim 5, wherein plural storage tanks, including the first storage tank and the second storage tank, of the string of storage tanks are designed so as to share one side instead of having two separate respective adjacent sides.

11. The system of claim 2, wherein the super circular shape is defined by fractional exponents n and/or m being greater than 2 and a=b and the super elliptical shape is defined by the fractional exponents n and/or m being greater than 2 and a≠b.

12. The system of claim 1, wherein the rectangle or square is respectively a golden rectangle.

13. The system of claim 1, wherein the first storage tank is designed, based on at least one of the one or more exterior sides of the first storage tank having been designed to have the super elliptical shape, to need less reinforcements for the first storage tank to counter outward forces, caused by internal pressures deriving from fluid stored in first storage tank along the at least one of the one or more exterior sides of the first storage tank, than if the at least one of the one or more exterior sides of the first storage tank was designed to be elliptical or circular shaped.

14. The system of claim 1, wherein the first storage tank is a cylinder designed to have a super elliptical cross-section, with the first storage tank being partitioned into two or more first sub-storage tanks.

15. The system of claim 14, wherein at least two of the two or more first sub-storage tanks have a same volume.

16. The system of claim 15, wherein the partitioning of the first storage tank includes partitioning the first storage tank into the at least two of the two or more first sub-storage tanks that have the same volume and partitioning the first storage tank into at least one second substorage tank having a different volume than the same volume of the at least two of the two or more first sub-storage tanks.

17. The system of claim 14, wherein at least two of the first sub-storage tanks have different volumes.

18. The system of claim 14, wherein the partitioning of the first storage tank includes partitioning out at least one portion of the first storage tank from an interior of the first storage tank, so that the partitioned out portion of the first storage tank provides mechanical access to inner facing sides of the partitioned first storage tank.

19. The system of claim 1, wherein the first storage tank is designed so that a crosssection along a first axis of the first storage tank has the super elliptical shape and so that a cross-section along a second axis of the first storage tank, orthogonal to the first axis, has another super elliptical shape.

20. A flow battery system comprising: a first battery stack including a first half-cell utilizing a liquid electrolyte; a feed system, including at least a first storage tank to store the liquid electrolyte and comprising a super elliptical cross-section, configured to provide the stored electrolyte to the first half-cell from at least the first storage tank; and a return system to return the liquid electrolyte from the first half-cell to the first feed system after having been charged or discharged by the first half-cell.

21. The system of claim 20, wherein the feed system further includes a string of storage tanks, including the first storage tank and a second storage tank, and at least two of the storage tanks in the string of storage tanks have super elliptical cross-sections and same volumes.

22. The system of claim 21, wherein the super elliptical cross-section of the first storage tank is designed to be within a golden rectangle.

23. The system of claim 20, wherein the feed system further includes a first booster tank, designed to generate a first booster pressure in the first booster tank for the liquid electrolyte in the first booster tank sufficient to force the liquid electrolyte to be fed from the first feed system through the first half-cell, and wherein the first booster tank is a tank formed by partitioning a larger storage tank, so that the partitioning of the larger storage tank forms the first booster tank and the first storage tank.

24. The system of claim 20, wherein the first storage tank is designed to have a vertical super elliptical side and a horizontal super elliptical cross-section, such that the super elliptical cross-section of the first storage tank is different from a super elliptical cross-section of a second storage tank of the feed system.

25. A storage method for storing fluids, comprising:
implementing use of a first storage tank having an internal first volume defined by one or more exterior sides of the first storage tank being designed to have a super elliptical shape circumscribed by a rectangle or square so that the internal first volume is greater than an internal volume of a storage tank designed to have an elliptical or circular shape circumscribed by the rectangle or the square,
wherein said first storage tank has at least one input port and at least one output port, and
wherein fluid within said first storage tank is circulated using said at least one input port and said at least one output port.

26. The method of claim 25, wherein a super circular shape, the super elliptical shape, the elliptical shape, and the circular shape are respectively defined by different Lamé curves, with the Lamé curves being defined according to:

$$\frac{x^n}{a^n} + \frac{y^m}{b^m} = 1,$$

wherein the super circular shape is a type of the super elliptical shape and defined by the exponents n and/or m being greater than 2 and a=b, the super elliptical shape is defined by the exponents n and/or m being greater than 2 and a≠b, the circular shape is defined by the exponents n and m being 2 and a=b, and the elliptical shape is defined by the exponents n and m being 2 and a≠b.

27. The method of claim 26, wherein the first storage tank is a cylinder designed to have a super elliptical cross-section so that more area within the rectangle or square is used to store fluid in the first storage tank than an area within the rectangle or square that would be used if the first storage tank was designed to have an elliptical or circular cross-section.

28. The method of claim 27, wherein, when m and n are 3, the more area within the rectangle or square used to store the fluid in the first storage tank is at least 9% greater than the area that would have been used if the first storage tank was designed to have the elliptical or circular cross-section.

29. The method of claim 26, further implementing use of a string of storage tanks, including the first storage tank and a second storage tank, with both of the first and second storage tanks being designed to have at least one respective super elliptical shaped side.

30. The method of claim 29, wherein the first storage tank and the second storage tank have a same designed internal volume based on the at least one respective super elliptical shaped side.

31. The method of claim 29, wherein the first storage tank and the second storage tank are designed to store liquid electrolyte for a flow battery system.

32. The method of claim 29, wherein plural storage tanks, including the first storage tank and the second storage tank, of the string of storage tanks are designed to have super elliptical cross-sections and are arranged adjacently in a tank farm that includes plural strings of storage tanks.

33. The method of claim 32, wherein one of the plural strings of storage tanks is designed to store a positive electrolyte and be connected to a positive side of a battery stack of a redox flow battery and another of the plural strings of storage tanks is designed to store a negative electrolyte and be connected to a negative side of the battery stack of the redox flow battery.

34. The method of claim 29, wherein plural storage tanks, including the first storage tank and the second storage tank, of the string of storage tanks are designed so as to share one side instead of having two separate respective adjacent sides.

35. The method of claim 26, wherein the super circular shape is defined by fractional exponents n and/or m being greater than 2 and a=b and the super elliptical shape is defined by the fractional exponents n and/or m being greater than 2 and a≠b.

36. The method of claim 25, wherein the rectangle or square is respectively a golden rectangle.

37. The method of claim 25, wherein the first storage tank is designed, based on at least one of the one or more exterior sides of the first storage tank having been designed to have the super elliptical shape, to need less reinforcements for the first storage tank to counter outward forces, caused by internal pressures deriving from fluid stored in first storage tank along the at least one of the one or more exterior sides of the first storage tank, than if the at least one of the one or more exterior sides of the first storage tank was designed to be elliptical or circular shaped.

38. The method of claim 25, wherein the first storage tank is a cylinder designed to have a super elliptical cross-section, with the first storage tank being partitioned into two or more first sub-storage tanks.

39. The method of claim 38, wherein at least two of the two or more first sub-storage tanks have a same volume.

40. The method of claim 39, wherein the partitioning of the first storage tank includes partitioning the first storage tank into the at least two of the two or more first sub-storage tanks that have the same volume and partitioning the first storage tank into at least one second substorage tank having a different volume than the same volume of the at least two of the two or more first sub-storage tanks.

41. The method of claim 38, wherein at least two of the first sub-storage tanks have different volumes.

42. The method of claim 38, wherein the partitioning of the first storage tank includes partitioning out at least one portion of the first storage tank from an interior of the first storage tank, so that the partitioned out portion of the first storage tank provides mechanical access to inner facing sides of the partitioned first storage tank.

43. The method of claim 25, wherein the first storage tank is designed so that a cross-section along a first axis of the first storage tank has the super elliptical shape and so that a cross-section along a second axis of the first storage tank, orthogonal to the first axis, has another super elliptical shape.

* * * * *